United States Patent [19]
Yeh et al.

[11] Patent Number: 4,761,059
[45] Date of Patent: Aug. 2, 1988

[54] EXTERNAL BEAM COMBINING OF MULTIPLE LASERS

[75] Inventors: Pochi A. Yeh, Thousand Oaks; Mark D. Ewbank; Mohsen Khoshnevisan, both of Newbury Park, all of Calif.

[73] Assignee: Rockwell International Corporation, El Segundo, Calif.

[21] Appl. No.: 890,055

[22] Filed: Jul. 28, 1986

[51] Int. Cl.$^4$ .................. G03H 1/02; G02F 1/01; G02B 5/23; G02B 27/10

[52] U.S. Cl. .................. 350/354; 350/355; 350/3.64; 350/169; 372/21

[58] Field of Search .............. 350/354, 3.64, 169, 350/355; 372/21

[56] References Cited

U.S. PATENT DOCUMENTS

| | | | |
|---|---|---|---|
| 4,220,928 | 9/1980 | Bloom et al. | 372/21 |
| 4,233,571 | 11/1980 | Wang et al. | 372/99 |
| 4,390,991 | 6/1983 | Pearson | 372/21 |
| 4,493,085 | 1/1985 | Valley | 372/19 |
| 4,493,086 | 1/1985 | Jain et al. | 372/21 |
| 4,505,536 | 3/1985 | Huignard et al. | 350/3.64 |
| 4,529,273 | 7/1985 | Cronin-Golomb et al. | 350/354 |
| 4,576,434 | 3/1986 | Huignard et al. | 350/3.64 |
| 4,586,779 | 5/1986 | Huignard et al. | 350/3.64 |
| 4,648,092 | 3/1987 | Ewbank et al. | 372/18 |

OTHER PUBLICATIONS

Chow, Phase Locking of Lasers by an Injected Signal, Optics Letters, vol. 7, p. 417 (1982).
Cronin-Golomb, et al., Laser with Dynamic Holographic Intracavity Distortion Correction Capability, Applied Physics Letters, vol. 41, p. 219 (1982).
Feinberg, Continuous-Wave Self-Pumped Phase Conjugator with Wide Field of view, Optics Letters, vol. 8, p. 480 (1983).
Fisher, et al., On-Resonant Phase-Conjugate Reflection and Amplification at 10.6 um in Inverted $CO_2$, Optics Letters, vol. 4, p. 140 (1979).
Giuliano, Applications of Optical Phase Conjugation, Physics Today, p. 27 (Apr., 1981).
Huignard, et al., Phase-Conjugate Waterfront Generation via Real-Time Holography in $Bi_{12}SiO_{20}$ Crystals, Optics Letters, vol. 4, p. 21 (1979).
Marrakchi, et al., Diffraction Efficiency and Energy Transfer in Two-Wave Mixing Experiments with $Bi_{12}SiO_{20}$ Crystals, Applied Physics, vol. 24, p. 131 (1981).
Pepper, Applications of Optical Phase Conjugation, Scientific American, p. 74 (Jan. 1986).
Pepper, Nonlinear Optical Phase Conjugation, Optical Engineering, vol. 21, p. 156 (1982).
Shkunov, Optical Phase Conjugation, Scientific American, p. 54 (Dec. 1985).
Yariv, Phase Conjugate Optics and Real-Time Holography, IEEE Journal of Quantum Electronics, vol. QE-14, p. 650 (1978).
Yeh, Contra-Directional Two-Wave Mixing in Photorefractive Media, Optics Communications, vol. 45, p. 323 (1983).

Primary Examiner—Eugene R. Laroche
Assistant Examiner—Michael B. Shingleton
Attorney, Agent, or Firm—H. Fredrick Hamann; Craig O. Malin; John J. Deinken

[57] ABSTRACT

A coupled laser system includes a plurality of substantially parallel beams of coherent radiation with an output beam of coherent radiation at an oblique angle with respect to the plurality of beams. A photorefractive element is positioned to receive the plurality of beams and the output beams, the beams being frequency locked to within the photorefractive bandwidth of the photorefractive element such that laser energy is diffracted from the plurality of beams to the output beam by means of two-wave mixing. A lens may be used for focussing the parallel beams in the photorefractive element, while a plurality of mirrors may be supplied for adjusting the orientation of the output beam within the photorefractive element. Another coupled laser system includes a plurality of lasers, each laser providing a beam of coherent radiation, an optical resonant cavity, and a photorefractive element positioned within the resonant cavity, the beam being frequency locked to within the photorefractive bandwidth of the photorefractive element such that laser energy is diffracted from the coherent beams to a coupling beam in the resonant cavity by means of two-wave mixing. The resonant cavity is defined by a unidirectional ring resonator, with a partially reflecting mirror, a first substantially 100% reflecting mirror, and a second substantially 100% reflecting mirror.

28 Claims, 5 Drawing Sheets

EXTERNAL BEAM COMBINING OF MULTIPLE LASERS

BACKGROUND OF THE INVENTION

This invention is concerned with techniques for efficiently coupling the energy output from multiple lasers.

Laser beam combining has been a subject of great interest in the field of high power lasers. Combining the power from multiple lasers is a highly desirable feature for such applications as phased-array laser radar and optical communications. The generic problem involves how to coherently combine two laser beams which have the same central frequency but a time-varying relative phase difference. Combining such beams is generally very difficult because the combining system must exhibit a dynamic response to phase variations.

In phased-array lasers, beam combining imposes very stringent conditions on the relative phases of the individual lasers. None of the phased-array diode lasers made to date provide for the control of these relative phases. Rather, each laser selects its own phase so as to minimize its threshold current. Generally, this process leads to undesirable phase differences between the laser beams emitted from the diode array.

Two laser beams can, in principle, be combined using a simple beam splitter or a grating, provided that the phases of the beams can be adjusted and maintained, both spatially and temporally, at optimum values. For a variety of reasons, however, such phase adjustment and maintenance is an extremely difficult task, particularly when moderate or high power lasers are involved. Active monitoring in time of the laser phases over the entire beam profiles is necessary. This phase monitoring is conventionally used to trigger servo systems to stabilize the phases for optimum coupling.

When an intracavity beam splitter is used as the coupling mechanism for injection locking two or more lasers, the phase of each injected beam generally will not coincide with the phase of the corresponding resonant cavity mode over any appreciable time interval.

For these reasons, and in spite of substantial ongoing efforts, the beam combining problem has not been adequately solved to date.

SUMMARY OF THE INVENTION

The coupled laser system of this invention includes a plurality of substantially parallel beams of coherent radiation with an output beam of coherent radiation at an oblique angle with respect to the plurality of beams. A photorefractive element is positioned to receive the plurality of beams and the output beam, the beams being frequency locked to within the photorefractive bandwidth of the photorefractive element such that laser energy is diffracted from the plurality of beams to the output beam by means of two-wave mixing.

In more particular embodiments, the photorefractive element is a photorefractive crystal selected from the group consisting of $AgGaS_2$, $AgGaSe_2$, $\beta$-$BaB_2O_4$, $BaTiO_3$, $Bi_{12}SiO_{20}$, GaAs, $KTaO_3$, $LiNbO_3$, and $Sr_xBa_{1-x}Nb_2O_6$, or the photorefractive element may be an artificial photorefractive element.

A lens may be used for focussing the parallel beams in the photorefractive element, while a plurality of mirrors may be supplied for adjusting the orientation of the output beam within the photorefractive element.

In another embodiment, the coupled laser system includes a plurality of lasers, each laser providing a beam of coherent radiation, an optical resonant cavity, and a photorefractive element positioned within the resonant cavity, the beams being frequency locked to within the photorefractive bandwidth of the photorefractive element such that laser energy is diffracted from the coherent beams to a coupling beam in the resonant cavity by means of two-wave mixing.

As with the first embodiment, the photorefractive element may be a photorefractive crystal selected from the group consisting of $AgGaS_2$, $AgGaSe_2$, $\beta$-$BaB_2O_4$, $BaTiO_3$, $Bi_{12}SiO_{20}$, GaAs, $KTaO_3$, $LiNbO_3$, and $Sr_xBa_{1-x}Nb_2O_6$, or the photorefractive element may be an artificial photorefractive element.

The resonant cavity in a more particular embodiment is defined by a substantially 100% reflecting mirror and a partially reflecting mirror, the mirrors being positioned such that the 100% reflecting mirror reflects the coupling beam toward the partially reflecting mirror and the partially reflecting mirror reflects a portion of the coupling beam toward the 100% reflecting mirror and transmits a portion of the coupling beam as an output beam.

This resonant cavity may further include a unidirectional ring resonator, with a partially reflecting mirror, a first substantially 100% reflecting mirror, and a second substantially 100% reflecting mirror, the mirrors being positioned such that the partially reflecting mirror reflects a portion of the coupling beam toward the first 100% reflecting mirror and transmits a portion of the coupling beam as an output beam, the first 100% reflecting mirror reflects the coupling beam toward the second 100% reflecting mirror, and the second 100% reflecting mirror reflects the coupling beam toward the partially reflecting mirror.

The invention also contemplates a method of coupling a plurality of beams of coherent radiation, which includes the steps of providing an optical resonant cavity, positioning a photorefractive element within the resonant cavity, frequency locking the beams to within the photorefractive bandwidth of the photorefractive element, and directing the coherent beams into the photorefractive element such that laser energy is diffracted from the coherent beams to a coupling beam in the resonant cavity by means of two-wave mixing.

DESCRIPTION OF THE INVENTION

Two-wave mixing is an optical phenomenon that has attracted considerable attention in recent years. A number of different phenomena utilizing two-wave mixing have been discussed in the literature, including image amplification, optical limiting, image subtraction, and coherent beam processing. It is an outstanding feature of this invention to employ two-wave mixing as the coupling mechanism to combine the energies from two or more separate laser resonant cavities into a single output. The nonlinear optical couplings which occur are used to combine the laser outputs. In this approach to beam combining, the dynamic holograms are generated in a nonlinear medium, through two-wave mixing, so that the laser beams are coherently coupled to produce a single beam containing nearly all of the incident energy.

When two waves are coupled in a photorefractive material, a nonreciprocal transfer of energy occurs, with no phase crosstalk. This lack of phase crosstalk is a result of self-diffraction from an index grating which is created in the material and which contains phase information regarding the source waves. The transfer of energy without phase crosstalk in photorefractive crystals, such as $AgGaS_2$, $AgGaSe_2$, $B\text{-}BaB_2O_4$, $BaTiO_3$, $Bi_{12}SiO_{20}$ (BSO), GaAs, $KTaO_3$, $LiNbO_3$, and $Sr_xBa_{1-x}Nb_2O_6$ (SBN), can be employed to coherently combine the energy of two or more lasers, provided the energy level is not high enough to damage the crystals.

Figure 1:
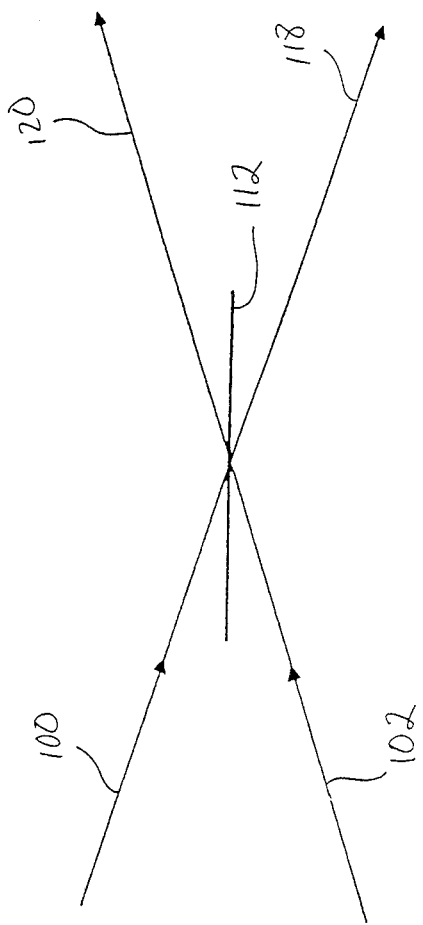
FIG. 1 is a schematic view illustrating the combining of two laser beams using a beamsplitter.

To examine the theory of operation behind the laser coupling systems of this invention, consider FIG. 1, which is a schematic view illustrating the combining of two laser beams 100 and 102 using a beamsplitter 112. It is assumed that the wavefronts of the beams are planar. If the phases of the two beams $\psi_1$ and $\psi_2$ are different and are functions of time, it is impossible to combine the energy in one of the output beams 118 and 120 unless a feedback loop is provided to adjust the position of the beamsplitter to maintain the phase difference $\Delta\psi = \psi_2 - \psi_1$ constant in time.

Figure 2:
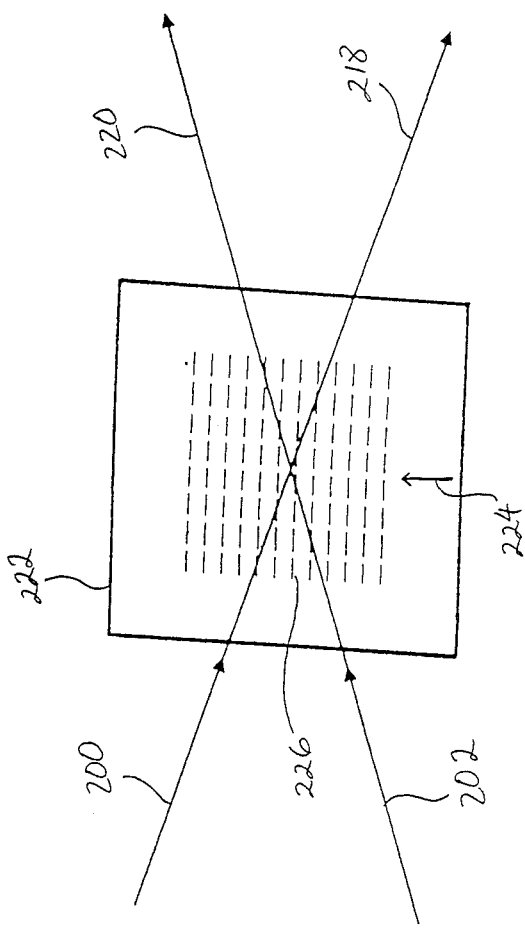
FIG. 2 is a schematic diagram representing a photorefractive crystal with two laser beams entering it.

Now compare this situation to the codirectional mixing of two planar beams in a photorefractive crystal. FIG. 2 is a schematic diagram representing a photorefractive crystal 222 with two beams 200 and 202 entering it. Let x be along the direction of the bisector of the two wave vectors. The electric field of the two waves can be written $$E_j = A_j(x) \exp[i(\vec{k_j}\cdot\vec{r} - w_j t)] + C.C. \quad j = 1, 2 \quad (1)$$

where $k_1$ and $k_2$ are the wave vectors, $w_1$ and $w_2$ are the frequencies of the waves, and "C.C." denotes the complex conjugate. Equation (1) assumes, for simplicity, that both waves have the same state of linear polarization and that the beam path is perpendicular to the c-axis 224 of the crystal. It is further assumed that no optical rotation is present in the material. $A_1$ and $A_2$ are the wave amplitudes and are taken as functions of x only for the steady-state situation.

In a photorefractive medium (from x=0 to x=l), these two waves generate an interference pattern (which will be travelling if $w_1 \neq w_2$). This pattern may generate and redistribute photocarriers. As a result, a spatial charge field (which will also be travelling if $w_1 \neq w_2$) is created in the medium. This field induces an index volume grating, represented by the dashed lines 226, via the Pockels effect. In general, the index grating will have a finite spatial phase shift relative to the interference pattern so that, following the notation of Fischer, et al. ("Amplified Reflection, Transmission and Self-Oscillation in Real-Time Holography", Optics Letters, Volume 6, Page 519 (1981)), the fundamental component of the intensity-induced grating may be written as $$n = n_o + (n_i/2)e^{i\phi}(A_1 A_2^*/I_o) \exp[i(\vec{K}\cdot\vec{r} - \Omega t)] + C.C. \quad (2)$$

where $$I_o = I_1 + I_2 = |A_1|^2 + |A_2|^2 \quad (3)$$

The amplitude of the index modulation ($n_1/2$) and the phase $\phi$ are real numbers $\vec{K} = \vec{K_1} - \vec{K_2}$, and $\Omega = w_1 - w_2$. This grating will move along the c-axis 224 inside the photorefractive crystal 222 with a velocity $V = \Omega/K$. Again for the sake of simplicity, a scalar grating is assumed. The phase $\phi$ indicates the degree to which the index grating is shifted spatially with respect to the light interference pattern. According to Huignard, et al., "Coherent Signal Beam Amplification in Two-Wave Mixing Experiments with Photorefractive BSO Crystals", Optics Communications, Volume 38, Page 249 (1981), $\phi$ and $n_1$ can be written as $$\phi = \phi_o + \tan^{-1}(\Omega\tau) \quad (4)$$

and $$n_1 = 2\Delta n_s/(1+\Omega^2\tau^2)^{\frac{1}{2}} \quad (5)$$

where $\tau$ is the time constant for building up the holograph grating, $\Delta n_s$ is the saturation value of the photoinduced index change, and $\phi_o$ is a constant phase shift related to the nonlocal response of the crystal under fringe illumination. Both parameters $\Delta n_s$ and $\phi_o$ depend on the grating spacing ($2\pi/K$) and its direction, as well as on the material properties of the crystal, e.g., the electro-optic coefficient. Expressions for $\Delta n_s$ and $\phi_o$ can be found in Kukhtarev, et al., "Holographic Storage in Electro-Optic Crystals. Beam Coupling and Light Amplification", Ferroelectrics, Volume 22, Page 961 (1979). In photorefractive media which operate by diffusion only (i.e., an external static field is not required), such as $BaTiO_3$, the magnitude of $\phi_o$ is $\pi/2$ with its sign depending on the direction of the c-axis. $\phi_o = 0$ in gas media. Since efficient energy coupling occurs only near $\phi = \pi/2$, it is desirable, for gas media, to have a velocity v approximately $1/K\tau$ such that both $\phi$ and $n_1$ are significant. By using Equation (2) for n and the scalar-wave equation, the following coupled equations can be derived with the assistance of the parabolic approximation (i.e., assuming slowly varying amplitudes)

$$\frac{d}{dz} A_1 = i\frac{\pi n_1}{\lambda I_o} e^{i\phi} |A_2|^2 A_1; \quad \frac{d}{dz} A_2 = i\frac{\pi n_1}{\lambda I_o} e^{-i\phi} |A_1|^2 A_2 \quad (6)$$

$$A_1 = \sqrt{I_1} \exp(i\psi_1); \quad A_2 = \sqrt{I_2} \exp(i\psi_2) \quad (7)$$

where $\psi_1$ and $\psi_2$ are phases of amplitudes $A_1$ and $A_2$, respectively. Using Equations (3) and (7), the coupled Equations (6) can be written in terms of the intensities $I_1$ and $I_2$ and the phases $\psi_1$ and $\psi_2$ as:

$$\frac{d}{dz} I_1 = -\gamma \frac{I_1 I_2}{I_1 + I_2}; \quad \frac{d}{dz} I_2 = \gamma \frac{I_1 I_2}{I_1 + I_2} \quad (8)$$

and $$\frac{d}{dz} \psi_1 = \beta \frac{I_2}{I_1 + I_2}; \quad \frac{d}{dz} \psi_2 = \beta \frac{I_1}{I_1 + I_2} \quad (9)$$

where $\gamma = (2\pi n_1/\lambda) \sin\phi$ and $\beta = (\pi n_1/\lambda) \cos\phi$. The solution for the intensities $I_1(z)$ and $I_2(z)$ is $$I_1(x) = \frac{I_1(0) + I_2(0)}{1 + m^{-1}e^{\gamma z}} \; ; \; I_2(x) = \frac{I_1(0) + I_2(0)}{1 + me^{-\gamma z}} \qquad (10)$$

where m is the input intensity ratio $m = I_1(o)/I_2(o)$. Note that the output beam 218 is amplified (assuming $\gamma > 0$) and the output beam 220 is attenuated, while the sum of the two beam intensities remains constant. Thus, energy is transferred from the input beam 202 to the output beam 218. In FIG. 2, $t_1$ and $t_2$ are transmissivities which depend on wavefront amplitudes $|A_1|^2$ only and are independent of $\phi_1$ and $\phi_2$.

According to Equation (9), there will be no phase crosstalk between the beams. In other words, if initially (at $x=0$) the beam 202 contains some phase information $\psi_{10}$, that phase information will not be transferred to the beam 218 even though energy will be transferred. Such a phenomenon can be explained in terms of diffraction from the self-induced dynamic hologram which is formed in a photorefractive crystal. Normally, if a beam which contains phase information $\psi_{10}$ is diffracted from a fixed grating, the same phase information $\psi_{10}$ also appears in the diffracted beam. In a self-induced dynamic hologram, however, the phase information $\psi_{10}$ is impressed into the grating in such a way that diffraction from such a grating will be accompanied by a phase shift of $-\psi_{10}$. Such a dynamic hologram makes it possible for the self-cancellation of phase information when the input beam 202 is diffracted and donates energy to the output beam 218. Thus, it is evident that the nonreciprocal transfer of energy in photorefractive crystals is an ideal mechanism for accomplishing coherent beam combining.

Figure 3:
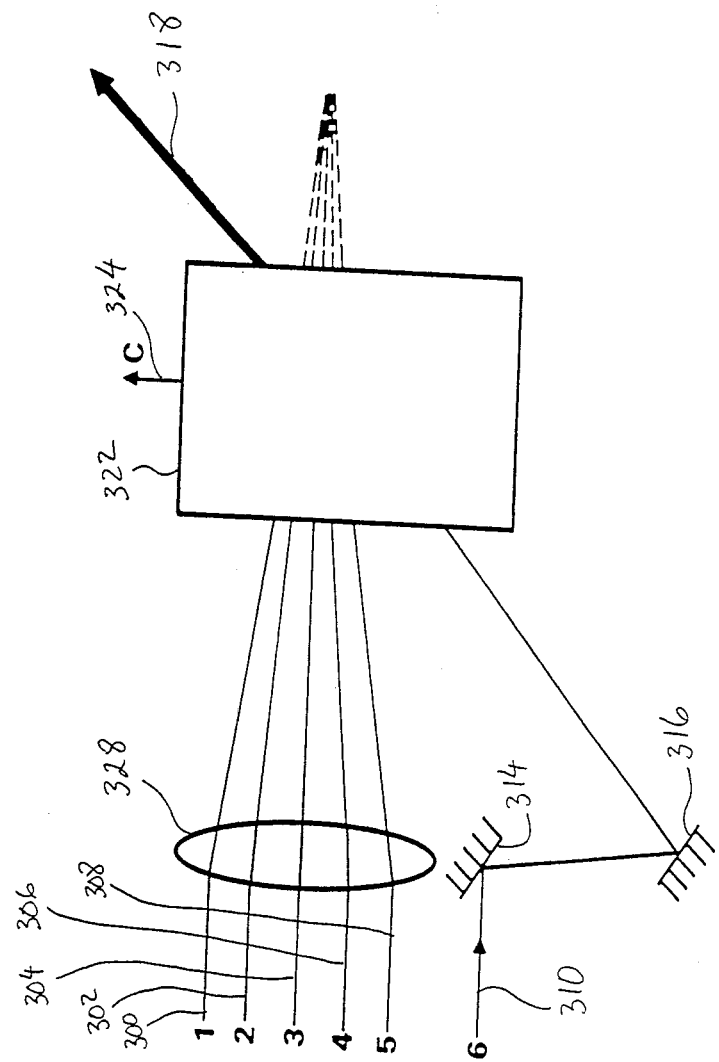
FIG. 3 depicts an embodiment of the invention in which an array of five laser beams obtained from a phased-array laser is focussed into a photorefractive crystal.

One embodiment of the invention is depicted in FIG. 3, in which an array of five laser beams 300-308 obtained from a phased-array laser is focussed by a lens 328 into a photorefractive crystal 322. The crystal is oriented with its c-axis as indicated by the arrow 324. A sixth laser beam 310 from the phased-array laser is reflected by first and second mirrors 314 and 316 so that it also traverses the crystal 322. The direction of the sixth beam 310 is arranged with respect to the c-axis and with respect to the first five beams so that photorefractive coupling within the crystal causes each of the five beams 300-308 to donate energy to the sixth beam. At the exit face of the crystal, most of the incoming energy is transferred in this fashion to the output beam 318 as a result of multiple two-wave mixing within the crystal 322.

The dimensions of the interaction regions and the specific angles for the direction of beam extraction with respect to the axes of the multiple resonators must be determined in practice for the specific laser systems. The nonlinear coupling process of this invention, however, will be a common feature for all such beam combiners.

When using beam combining in photorefractive crystals, the relative phases of the input beams can be arbitrary because of the dynamic nature of the hologram involved in energy transfer. Since the phases of most laser arrays are uncontrollable, photorefractive beam combining is a very attractive technique because efficient combining occurs at any relative phase. Such a beam combining technique can also allow a slight difference in the frequencies of the beams, provided the difference is such that $$\Omega \tau << \qquad (11)$$

where $\Omega$ is the frequency difference between the beams and $\tau$ is the response time of the crystal. The beam combining efficiency can be defined for the case of two-beam combining, using Equation (10) and defining $\eta$ as $$\eta \equiv \frac{I_2(l) - I_2(0)}{I_1(0)} = \frac{e^{\gamma l} - 1}{e^{\gamma l} + m} \qquad (12)$$

where m is the beam intensity ratio at the input face (i.e., $m = I_1(o)/I_2(o)$). For $m=1$ and $\gamma l = 5$, this efficiency is $\eta = 99\%$ (disregarding absorption).

Figure 4:
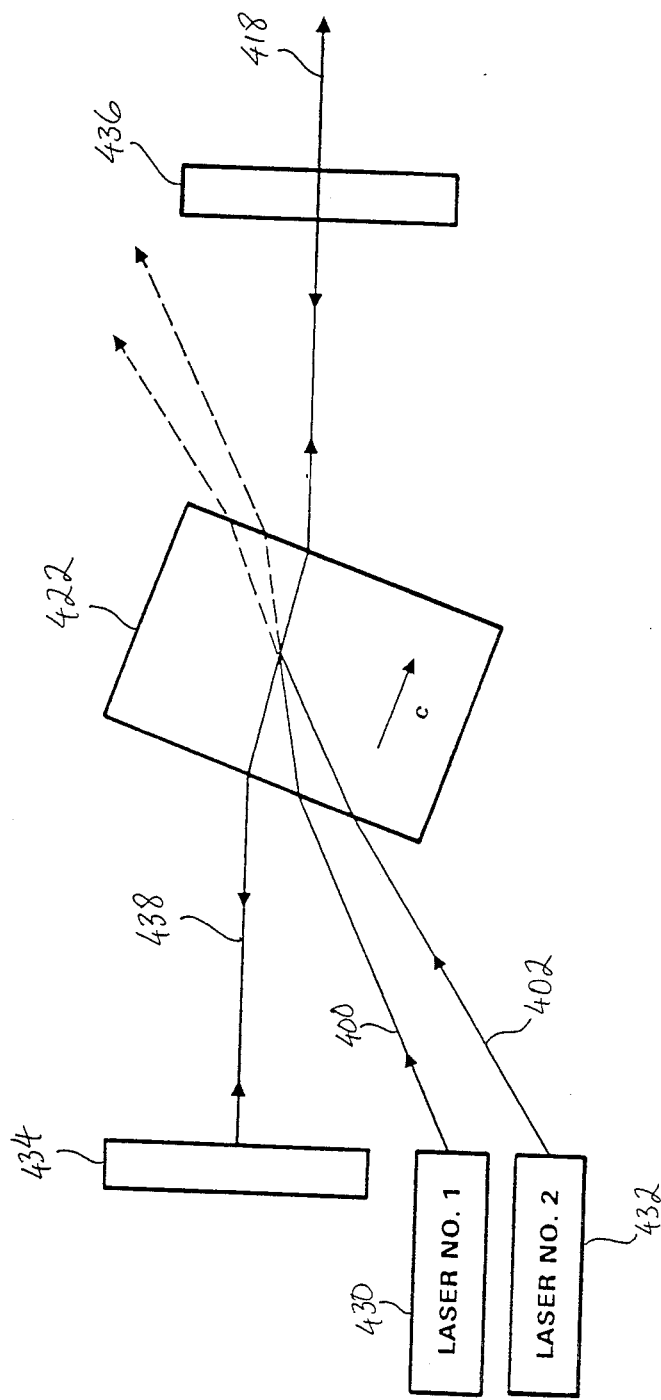
FIG. 4 is a schematic illustration of another embodiment of the invention, in which two laser beams are combined in a coupled laser system.

FIG. 4 is a schematic illustration of another embodiment of the invention, in which two laser beams are combined. This coupled laser system includes a first laser 430, which provides a first coherent beam 400, and a second laser 432, with a second coherent beam 402. A resonant cavity is defined by a 100% reflecting mirror 434 and a partially reflecting mirror 436. A nonlinear medium, such as a photorefractive crystal 422, is positioned within the resonant cavity.

The operation of this system can best be explained by first considering each laser beam separately. When the beam 400 traverses the crystal 422, some of the light which is scattered from the beam is reflected back through the crystal by the mirror 436. Because the mirrors are positioned so that each reflects light toward the other, this light is retroreflected into the crystal by the mirror 434 to constitute a coupling beam 438. This coupling beam can interfere with the incident beam 400 within the crystal to write a photorefractive hologram or index grating in the crystal. This grating will, in turn, diffract additional light from the incident beam 400 into the coupling beam 438. This process continues so that the diffraction grating is reinforced. In the steady state, almost all (more than 99%) of the incident beam 400 from the laser 430 will be diverted into the resonant cavity. In a similar manner, the incident beam 402 from the second laser 432 will be substantially diverted into the coupling beam 438. The frequency of each self-oscillation (in the coupling beam 438) may be nondegenerate with the frequency of either incident beam 400 or 402 to satisfy the round trip phase oscillation condition of the resonant cavity (see Ewbank, et al., Frequency Shift and Cavity Length in Photorefractive Resonators, Optics Letters, Volume 10, Page 496 (1985), the teaching of which is incorporated by reference).

If both of the laser beams impinge on the crystal simultaneously, while the energy diversion process operates with nearly the same efficiency as for each beam alone and the self-oscillation is single frequency, then the two laser beams will effectively be combined into the single coupling beam 438, which resonates between the mirrors 434 and 436. Since the mirror 436 is partially transmitting, it can serve as an output coupler for the resonant cavity by permitting the transmission of the combined output beam 418.

Figure 5:
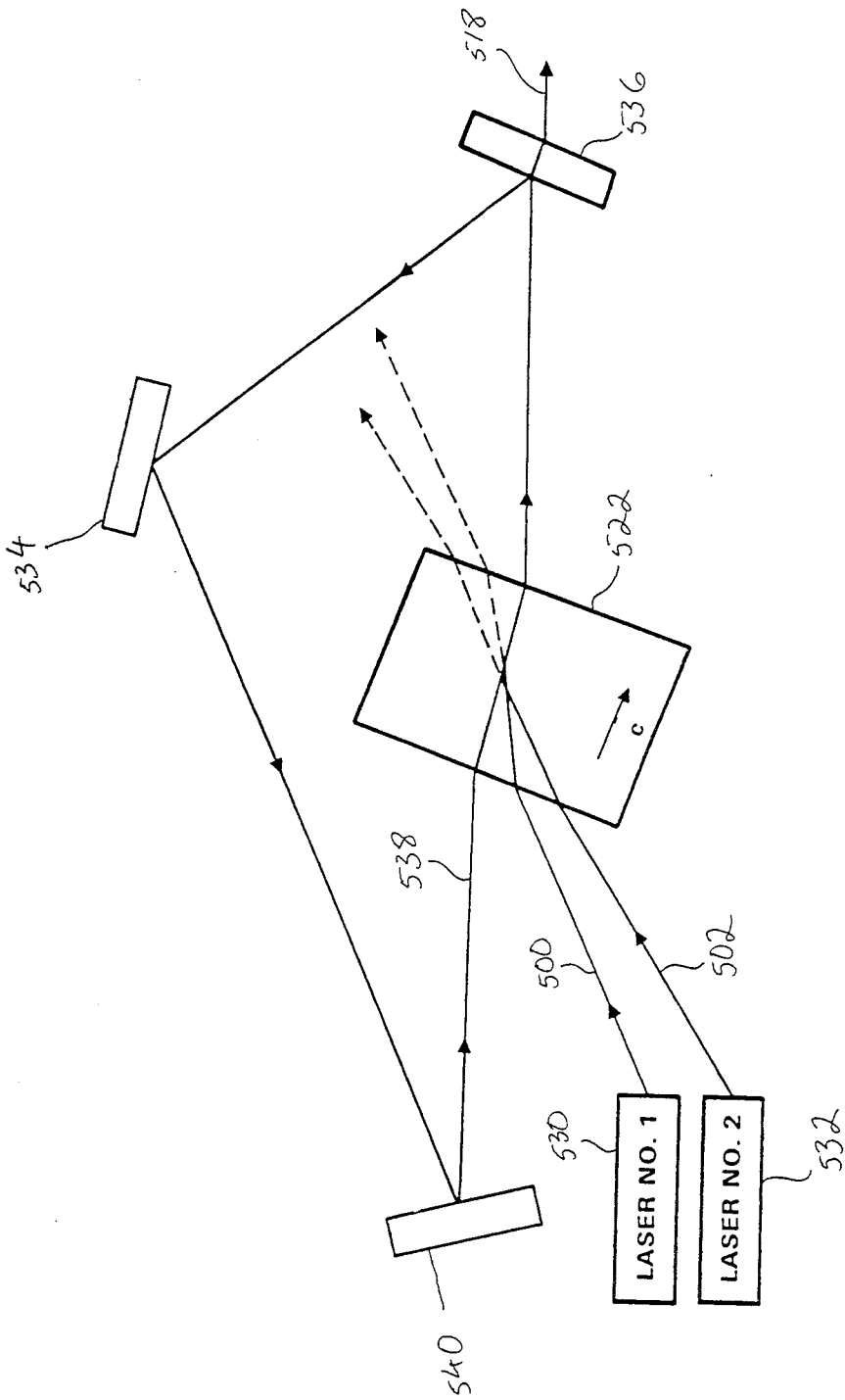
FIG. 5 illustrates schematically a unidirectional ring resonator configuration of the invention.

The invention as implemented in FIG. 4 with a linear resonant cavity can exhibit a complicating effect which may or may not be beneficial. That effect involves phase-conjugate reflections which are exactly retroreflected back towards each laser source. These reflections appear via degenerate four-wave mixing processes where the counterpropagating beams in the resonant cavity serve as pumps and the incident laser beams from the two lasers act as probes. These phase-conjugate reflections might serve as a coupling mechanism to phase lock the multiple lasers, but the reflections might also destabilize the lasers. To avoid such a problem, a unidirectional ring resonator configuration, as illustrated in FIG. 5, can be employed to externally combine the multiple laser beams. In this embodiment, the lasers 530 and 532, the output beams 500 and 502, the photorefractive crystal 522, the coupling beam 538, and the combined output beam 518 all operate similar to the analogous elements of FIG. 4. Here, however, the resonant cavity is defined by three mirrors 534, 536, and 540. The mirror 536 is partially reflecting and reflects a portion of the coupling beam toward the 100% reflecting mirror 534. The mirror 534 reflects the coupling beam toward the second 100% reflecting mirror 540. The mirror 540 reflects, in turn, the coupling beam toward the mirror 536. Consequently, the coupling beam travels only in a counterclockwise direction in the resonant cavity to eliminate any four-wave mixing in the system.

Hologram formation in a photorefractive medium allows a phase shift between the light interference fringe pattern and the refractive index modulation, provided the material is acentric. This phase shift (nonlocal response) permits a nonreciprocal steady-state transfer of energy between the incoming light beams, as described above. For low to medium power levels, photorefractive crystals such as SBN, $BaTiO_3$, BSO, $LiNbO_3$, and BGO are adequate for beam combining. Hologram formation in these materials, however, is very slow. Moreover, these materials are effective only for visible light. Other photorefractive crystals, such as GaAs, CdTe, GaP, InP, and other semiconductors, are faster and will operate in the infrared spectral region. The power levels in high power laser applications, however, are too great to be withstood by any solid material. Gases and fluids, because of their optical isotropy, have never been considered as candidate photorefractive materials. A non-local response can be artificially induced in a gas or fluid, however, by applying an external field or simply by moving the medium. Artificial photorefractive media, in which the photorefractive effect is induced artificially by external means, can be employed in high power systems to coherently combine the energy of two or more laser beams, again due to the lack of phase crosstalk and the dynamic nature of holographic two-wave mixing in these media. With this approach, gases or fluids may be the best materials for high power laser beam coupling, using techniques similar to those previously described for photorefractive crystals.

The concept of the artificial photorefractive effect is based on the finite temporal response of the materials. In the normal case, the Kerr effect in most gases or fluids is a local effect and thus cannot be used for laser energy coupling. If the dielectric relaxation time for the medium is finite, however, then a nonlocal response can be artificially induced. Consider a medium which is moving relative to the incoming laser beams. An interference pattern will be formed by two laser beams of the same frequency. Let $\alpha$ be the polarizability of the atoms (or molecules). Periodic potential wells will be formed by the interference pattern whose height is given by $U_o = \frac{1}{2}\alpha A_o^2$, where $A_o$ is the amplitude of the interference (standing or moving) wave. For efficient coupling, $U_o$ must be much greater than kT. When $U_o >> kT$, particles will be confined in the potential wells and thus an index modulation will be formed. If the medium is moving with a finite velocity relative to the interference pattern, this motion will produce a nonlocal response which makes energy transfer possible. If the particles are charged, an externally applied dc electric field can also induce a nonlocal response. The intensity of the fringe pattern will induce an index grating. Because of the motion of the medium and the finite response time of the material, however, the induced index grating is shifted spatially with respect to the fringe pattern. For a sinusoidal fringe pattern, this spatial phase shift is given by arctan (Kv$\tau$), where K is the grating momentum (i.e., $K = 2\pi/\Lambda$, where $\Lambda$ is the fringe spacing), V is the velocity of the medium relative to the laser beams, and $\tau$ is the dielectric relaxation time. An induced phase shift is obtained by moving the medium relative to the beams. To achieve a phase shift of 45°, the velocity of the medium must be equal to $1/K\tau$. For the case of visible lasers with 0.5 um wavelengths and a medium with a response time of 1 ns, this velocity is 400 m/s. From the point of view of relativity, degenerate two-wave mixing in a moving medium is equivalent to nondegenerate two-wave mixing in a stationary medium. Therefore, a second way of achieving such an artificially photorefractive medium is by shifting the frequency of one beam relative to the other.

The teaching of the following documents, which are referred to herein, is incorporated by reference: Fischer, et al. ("Amplified Reflection, Transmission and Self-Oscillation in Real-Time Holography", Optics Letters, Volume 6, Page 519 (1981), Huignard, et al., "Coherent Signal Beam Amplification in Two-Wave Mixing Experiments with Photorefractive BSO Crystals", Optics Communications, Volume 38, Page 249 (1981), and Kukhtarev, et al., "Holographic Storage in Electro-Optic Crystals. Beam Coupling and Light Amplification", Ferroelectrics, Volume 22, Page 961 (1979)

We claim:

1. A coupled laser system, comprising:
   a plurality of substantially parallel beams of coherent radiation;
   an output beam of coherent radiation at an oblique angle with respect to the plurality of beams; and
   a photorefractive element positioned to receive the plurality of beams and the output beam, the beams being frequency locked to within the photorefractive bandwidth of the photorefractive element such that laser energy is diffracted from the plurality of beams to the output beam by means of two-wave mixing.

2. The laser system of claim 1, wherein the photorefractive element is a photorefractive crystal selected from the group consisting of $AgGaS_2$, $AgGaSe_2$, $\beta$-$BaB_2O_4$, $BaTiO_3$, $Bi_{12}SiO_{20}$, GaAs, $KTaO_3$, $LiNbO_3$, and $Sr_xBa_{1-x}Nb_2O_6$.

3. The laser system of claim 1, wherein the photorefractive element further comprises an artificial photorefractive element.

4. The laser system of claim 3, wherein the artificial photorefractive element further comprises a nonlinear medium which is in motion relative to the plurality of beams and the output beam.

5. The laser system of claim 3, wherein the artificial photorefractive element further comprises a nonlinear medium and the plurality of beams differs in frequency from the output beam by an amount sufficient to cause two wave mixing within the nonlinear medium.

6. The laser system of claim 1, further comprising a lens for focussing the parallel beams in the photorefractive element.

7. The laser system of claim 6, further comprising a plurality of mirrors for adjusting the orientation of the output beam within the photorefractive element.

8. A coupled laser system, comprising:
a plurality of lasers, each laser providing a beam of coherent radiation;
an optical resonant cavity;
a coupling beam in the resonant cavity; and
a photorefractive element positioned within the resonant cavity, the beams being frequency locked to within the photorefractive bandwidth of the photorefractive element such that laser energy is diffracted from the coherent beams to the coupling beam by means of two-wave mixing.

9. The laser system of claim 8, wherein the photorefractive element is a photorefractive crystal selected from the group consisting of $AgGaS_2$, $AgGaSe_2$, $\beta\text{-}BaB_2O_4$, $BaTiO_3$, $Bi_{12}SiO_{20}$, $GaAs$, $KTaO_3$, $LiNbO_3$, and $Sr_xBa_{1-x}Nb_2O_6$.

10. The laser system of claim 8, wherein the photorefractive element further comprises an artificial photorefractive element.

11. The laser system of claim 10, wherein the artificial photorefractive element further comprises a nonlinear medium which is in motion relative to the plurality of beams and the output beam.

12. The laser system of claim 10, wherein the artificial photorefractive element further comprises a nonlinear medium and the plurality of beams differs in frequency from the output beam by an amount sufficient to cause two wave mixing within the nonlinear medium.

13. The laser system of claim 8, wherein the resonant cavity further comprises:
a substantially 100% reflecting mirror; and
a partially reflecting mirror,
the mirrors being positioned such that the 100% reflecting mirror reflects the coupling beam toward the partially reflecting mirror and the partially reflecting mirror reflects a portion of the coupling beam toward the 100% reflecting mirror and transmits a portion of the coupling beam as an output beam.

14. The laser system of claim 8, wherein the resonant cavity further comprises a unidirectional ring resonator, including:
a partially reflecting mirror;
a first substantially 100% reflecting mirror; and
a second substantially 100% reflecting mirror;
the mirrors being positioned such that the partially reflecting mirror reflects a portion of the coupling beam toward the first 100% reflecting mirror and transmits a portion of the coupling beam as an output beam, the first 100% reflecting mirror reflects the coupling beam toward the second 100% reflecting mirror, and the second 100% reflecting mirror reflects the coupling beam toward the partially reflecting mirror.

15. A method of coupling a plurality of beams of coherent radiation, comprising the steps of:
arranging the beams to be substantially parallel;
directing the parallel beams into a photorefractive element;
directing an output beam of coherent radiation into the photorefractive element; and
frequency locking each parallel beam to the output beam within the photorefractive bandwidth of the photorefractive element such that laser energy is diffracted from the plurality of beams to the output beam by means of two-wave mixing in the element.

16. The method of claim 15, wherein the photorefractive element is a photorefractive crystal selected from the group consisting of $AgGaS_2$, $AgGaSe_2$, $\beta\text{-}BaB_2O_4$, $BaTiO_3$, $Bi_{12}SiO_{20}$, $GaAs$, $KTaO_3$, $LiNbO_3$, and $Sr_xBa_{1-x}Nb_2O_6$.

17. The method of claim 15, wherein the photorefractive element further comprises an artificial photorefractive element.

18. The method of claim 17, wherein the artificial photorefractive element further comprises a nonlinear medium which is in motion relative to the plurality of beams and the output beam.

19. The method of claim 17, wherein the artificial photorefractive element further comprises a nonlinear medium and the plurality of beams differs in frequency from the output beam by an amount sufficient to cause two wave mixing within the nonlinear medium.

20. The method of claim 15, further comprising a lens for focussing the parallel beams in the photorefractive element.

21. The method of claim 20, further comprising a plurality of mirrors for adjusting the orientation of the output beam within the photorefractive element.

22. A method of coupling a plurality of beams of coherent radiation, comprising the steps of:
providing an optical resonant cavity
positioning a photorefractive element within the resonant cavity;
providing a coupling beam in the resonant cavity;
frequency locking the beams to within the photorefractive bandwidth of the photorefractive element; and
directing the coherent beams into the photorefractive element such that laser energy is diffracted from the coherent beam to the coupling beam by means of two-wave mixing.

23. The method of claim 22, wherein the photorefractive element is a photorefractive crystal selected from the group consisting of $AgGaS_2$, $AgGaSe_2$, $\beta\text{-}BaB_2O_4$, $BaTiO_3$, $Bi_{12}SiO_{20}$, $GaAs$, $KTaO_3$, $LiNbO_3$, and $Sr_xBa_{1-x}Nb_2O_6$.

24. The method of claim 22, wherein the photorefractive element further comprises an artificial photorefractive element.

25. The method of claim 24, wherein the artificial photorefractive element further comprises a nonlinear medium which is in motion relative to the plurality of beams and the output beam.

26. The method of claim 24, wherein the artificial photorefractive element further comprises a nonlinear medium and the plurality of beams differs in frequency from the output beam by an amount sufficient to cause two wave mixing within the nonlinear medium.

27. The method of claim 22, wherein the resonant cavity further comprises:
a substantially 100% reflecting mirror; and
a partially reflecting mirror,
the mirrors being positioned such that the 100% reflecting mirror reflects the coupling beam toward the partially reflecting mirror and the partially reflecting mirror reflects a portion of the coupling beam toward the 100% reflecting mirror and transmits a portion of the coupling beam as an output beam.

28. The method of claim 22, wherein the resonant cavity further comprises a unidirectional ring resonator, including:
 a partially reflecting mirror;
 a first substantially 100% reflecting mirror; and
 a second substantially 100% reflecting mirror; the mirrors being positioned such that the partially reflecting mirror reflects a portion of the coupling beam toward the first 100% reflecting mirror and transmits a portion of the coupling beam as an output beam, the first 100% reflecting mirror reflects the coupling beam toward the second 100% reflecting mirror, and the second 100% reflecting mirror reflects the coupling beam toward the partially reflecting mirror.

* * * * *